United States Patent [19]

Matsuda et al.

[11] Patent Number: 5,547,428
[45] Date of Patent: Aug. 20, 1996

[54] TRANSMISSION

[75] Inventors: Yutaka Matsuda, Toyonaka; Kaoru Shimizu, Osaka, both of Japan

[73] Assignee: Matsushita Electric Industrial Co., Ltd., Osaka, Japan

[21] Appl. No.: 412,713

[22] Filed: Mar. 28, 1995

[30]  Foreign Application Priority Data

May 12, 1994  [JP]  Japan .................................. 6-098520

[51] Int. Cl.⁶ .................................................. F16H 55/54
[52] U.S. Cl. .................................................. 474/51; 474/52
[58] Field of Search ........................... 474/47, 49, 51–53

[56]  References Cited

U.S. PATENT DOCUMENTS 1,158,886  11/1915  Beede ........................................ 474/52
3,106,850  10/1963  Clisset .................................... 474/47 X

FOREIGN PATENT DOCUMENTS 63-145860  6/1988  Japan .
2-54947    4/1990  Japan .
3-20420    1/1991  Japan .
3-259843  11/1991  Japan .

Primary Examiner—Roger J. Schoeppel
Attorney, Agent, or Firm—Ratner & Prestia

[57]  ABSTRACT

A transmission having at least one variable outer diameter pulley which includes a generally cylindrical pipe having four equally spaced penetrating holes radially disposed in its cylindrical wall, a sealing means having a diaphragm positioned adjacent each of the penetrating holes and fitted to the pipe support, and sliders forming a pulley peripheral face fitted into each penetrating hole to be able to slide smoothly. Each slider is moved by diaphragms in a direction so the pulley outer diameter expands by compressed air supplied through a fluid supply passage in a rotary axle which supports the pulley. Exhausting the compressed air causes the pulley outer diameter to decrease and restores the pulley to its original size by a tension coil spring around the pulley periphery.

18 Claims, 9 Drawing Sheets

TRANSMISSION

BACKGROUND OF THE INVENTION

(1) Field of the Invention

The present invention relates to a transmission with pulleys whose outer diameters are variable.

(2) Description of the Prior Art

In agricultural machines and vehicles with combustion engines, bicycles and various other kinds of machines, step or continuous (stepless) transmissions which can control the number of revolutions of the output shafts are used.

A continuous transmission proposed in Japanese Patent Laid-Open Application 63-145860 provides a pulley in which the outer diameter varies by slide parts dividing a band wheel in a guide wheel with radially disposed gutters. The slide parts and guide blocks which slide on a rotary shaft are linked by a link rod. Another construction, which moves one of the slide plates included in a V pulley, is proposed in Japanese Utility Model 2-54947.

For a variable outer diameter roller using fluid such as compressed air, for example, Japanese Patent Laid-Open Application 3-20420 and Japanese Patent Laid-Open Application 3-259843 propose a roller in which the outer diameter is varied by supplying fluid, such as, a gas, to a pressure chamber (including a combination of a plurality of pressure chambers) made of tubular elastics and fixed to a rotary axle, and then expanding the tubular elastics.

In Japanese Patent Laid-Open Application 63-145860 using the above-mentioned variable outer diameter pulley, however, a link mechanism and slide parts with divided band wheels are used and the construction is complex because a number of parts are used.

Also, in Japanese Utility Model 2-54947, the transmission mechanism is complex, its capacity is large, it requires a large number of man-hours for assembly, and requires large cost expendatures.

SUMMARY OF THE INVENTION

A transmission in accordance with an exemplary embodiment of the present invention includes a pair of pulleys providing a variable outer diameter pulley on at least one side and power transmission means for transmitting power between the pair of pulleys. The variable outer diameter pulley is constructed so that a plurality of sliders radially disposed around an axis of rotation of the pulley are moved by the pressure supplied by a fluid, such as air or oil, and the outer diameter of the pulley is enlarged as the sliders move away from the axis of rotation of the pulley.

Various kinds of belts, such as a round belt, a flat belt, a V-belt, a timing belt, or a chain, are used as power transmission means. The variable outer diameter pulley contains sealing parts in the form of pot-shaped elastic diaphragms disposed adjacent each penetrating hole inside a pipe or main body of the pulley. A plurality of penetrating holes are disposed in the cylindrical wall of the pipe. Sliders forming a peripheral face of the pulley are fitted into each one of the penetrating holes so that each slider is able to slide smoothly. The sealing parts and the pipe are held in air-tight relation between side plates at both ends of the pipe. A rotary axle having a central fluid passage and connecting holes for supplying fluid to push the diaphragms is disposed on the axis of the pipe through the side plates. The sliders are pushed and moved in a direction so that the outer diameter of the pulley expands due to fluid supplied from a rotary coupling connected to the rotary axle through the passage in the axle to the diaphragms.

The pot-shaped diaphragms, attached inside the air-tight pipe, are deformed into flat plates by fluid supplied through the connecting hole and the passage in the rotary axle. At the same time, the sliders fitted into the pot-shaped diaphragms through the penetrating holes in the pipe wall are pushed out of the pipe. As a result, the peripheral parts that are located on the tops of the sliders and form a pulley peripheral face are pushed out a designated distance and the pulley increases to a desired (enlarged) outer diameter size.

The side plates restrict the range of movement (upper dead point) of the sliders.

When the fluid inside the pipe is exhausted from the variable outer diameter pulley, the sliders return to their original positions in the diaphragms by way of a tension coil spring or a rubber ring inserted in the gutters of the peripheral parts of the pulley. As a result, the peripheral parts of the tops of the sliders return to their initial positions and the pulley regains its initial (small) outer diameter.

A variable outer diameter pulley used in a transmission in accordance with an exemplary embodiment of the present invention has a very simple construction and no excess force is applied to the diaphragms. Only a small amount of compression and bending distortion occur when the diaphragms deform from a pot-shape to a flat plate shape. The maximum outer diameter size of the pulley formed by the sliders is always constant and is independent of fluid pressure applied to the diaphragms, because the range of movement of the sliders is restricted by the side plates.

Furthermore, it is possible to use any one of a round belt, a flat belt, a timing belt, a chain, etc. as well as a V-belt as a power transmission means.

DETAILED DESCRIPTION OF THE INVENTION

First Exemplary Embodiment

Figure 1A:
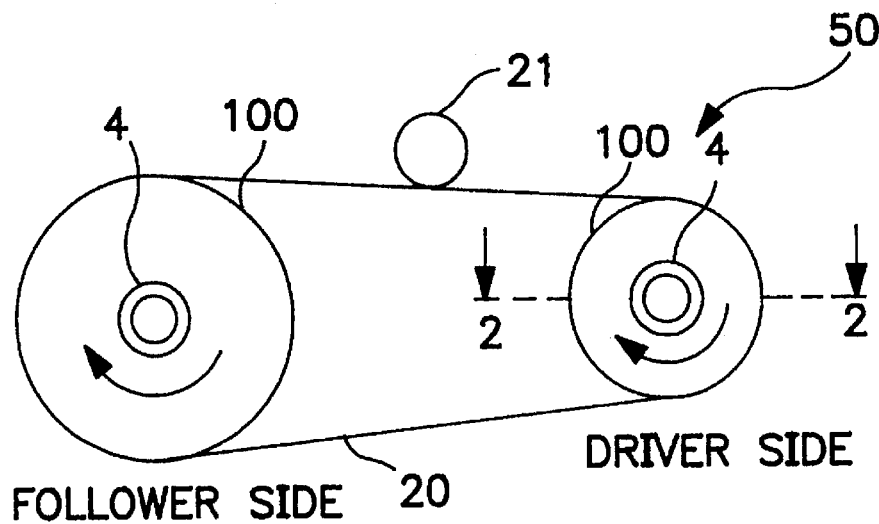
FIGS. 1(A) and (B) are schematic representations of a transmission ill accordance with a first exemplary embodiment of the present invention.
Figure 1B:
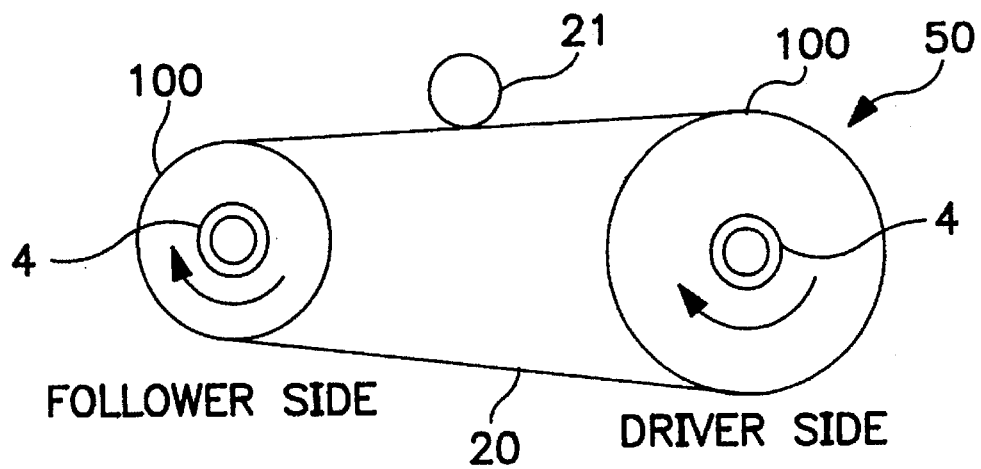

A transmission 50 in accordance with a first exemplary embodiment of the present invention is illustrated in FIGS. 1A and 1B.

Transmission 50 includes a pair of variable outer diameter pulleys 100 and a belt 20 as power transmission means. Each one of the variable outer diameter pulleys 100 is attached to an axle 4 at a driver side and at a follower side, respectively. The axles 4 are located in parallel and supported for revolution at both ends by bearings, such as ball bearings or cylindrical metals. The axles 4 have hollow portions on their axes for supplying fluid to the inside of the pulleys 100.

The axle 4 of the driver side is rotated by an engine or a motor which is not shown in FIGS. 1(A) or 1(B). The rotation at the driver side is transmitted to the axle 4 at the follower side by power transmission means such as a belt or a chain 20.

For a belt 20, any belt such as a round belt, a flat belt, or a timing belt can be used, as well as a V-belt. FIG. 1(A) illustrates a transmission using a flat belt held in tension between the pulleys 100.

Each variable outer diameter pulley 100 at the driver side and the follower side can have different outer diameter sizes, a small diameter and a large diameter, as shown in FIGS. 1(A) and 1(B). There are four combinations of the outer diameter sizes. In the case in which both pulleys have the same diameter size, the number of rotations of the pulley at the follower side is the same as that at the driver side. Actually, the pulley at the follower side has three types of rotations. That is, the number of rotations of the axle 4 at the follower side can be switched in three steps in the transmission 50.

Both the pulleys at the driver side and the follower side can have two diameter sizes, an original size, d1 (smaller) and an expanded size, d2 (larger).

Therefore, there are four combinations of pulley diameters as follows.

1) The driver pully being original, d1 and the follower pulley being original, d1;

2) The driver pully being original, d1 and the follower pulley being enlarged, d2;

3) The driver pulley being enlarged, d2 and the follower pulley being original, d1; and 4) The driver pulley being enlarged, d2 and the follower pulley being enlarged, d2.

Therefore, in case (1), the follower's speed of rotation is d1/d1 times that of the driver's speed of rotation, i.e., the same as the driver's speed of rotation; in case (2), the follower's speed of rotation is d1/d2 times that of the driver's speed of rotation; in case (3), the follower's speed of rotation is d2/d1 times that of the driver's speed of rotation; and in case (4), the follower's speed of rotation is d2/d2 times that of the driver's speed of rotation, i.e., the same as the driver's speed of rotation.

In cases (1) and (2), however, the follower's speed of rotation is same as the driver's speed of rotation and it means both cases are the same. Therefore, the follower has three speeds of rotation, 1, d1/d2 and d2/d1 times of the driver's speed of rotation.

FIG. 1(A) illustrates a condition in which the variable outer diameter pulley 100 at the follower side expands its outer diameter size by being supplied with fluid. The variable outer diameter pulley 100 at the driver side is not supplied with fluid and its outer diameter retains its original small outer diameter.

FIG. 1(B) illustrates a condition in which the variable outer diameter pulley 100 at the driver side expands its outer diameter size by being supplied with fluid, while the follower side retains its original small outer diameter.

Varying of the outer diameter of the variable outer diameter pulley 100 is performed automatically or manually using a fluid-controlled valve such as a solenoid valve or fluidic element. The belt tension for each position is adjusted by means such as a tension roller 21 or a tension pulley.

Any fluid such as air, oil, etc. can be used. An air compressor combined with the transmission in one unit, an ordinary power compressor or a manual air pump provided separately from the transmission can be used to supply the fluid.

Figure 2:
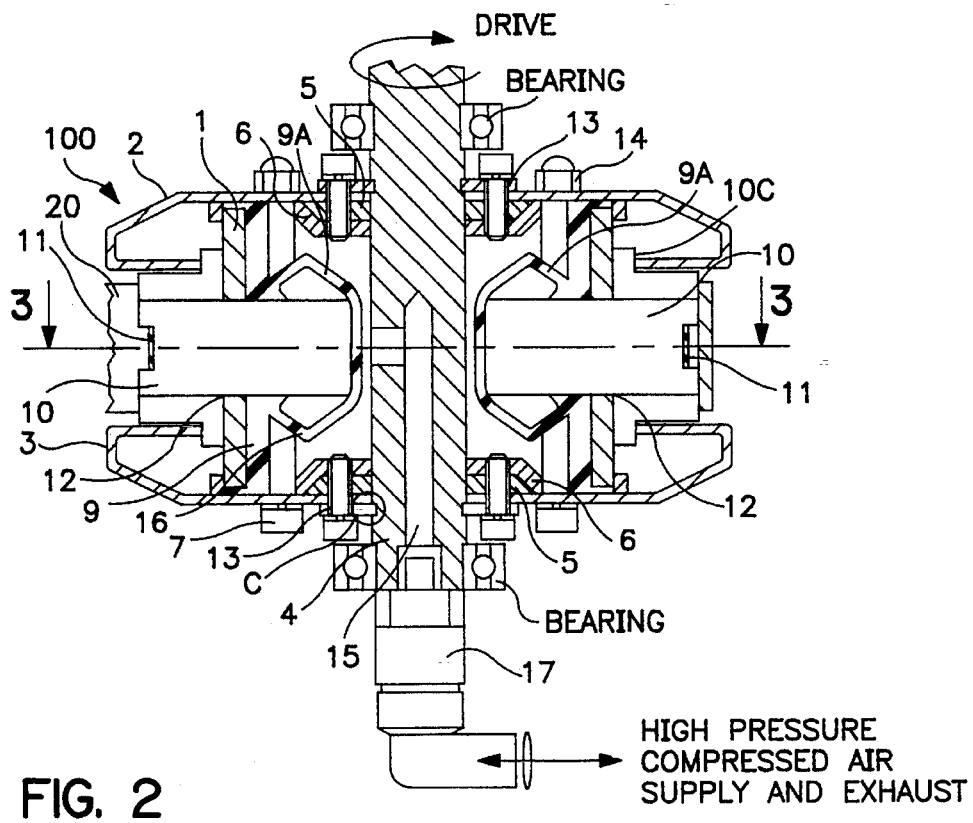
FIG. 2 is a cross sectional view of a variable outer diameter pulley used in a transmission taken along line 2—2 of FIG. 1A.
Figure 3:
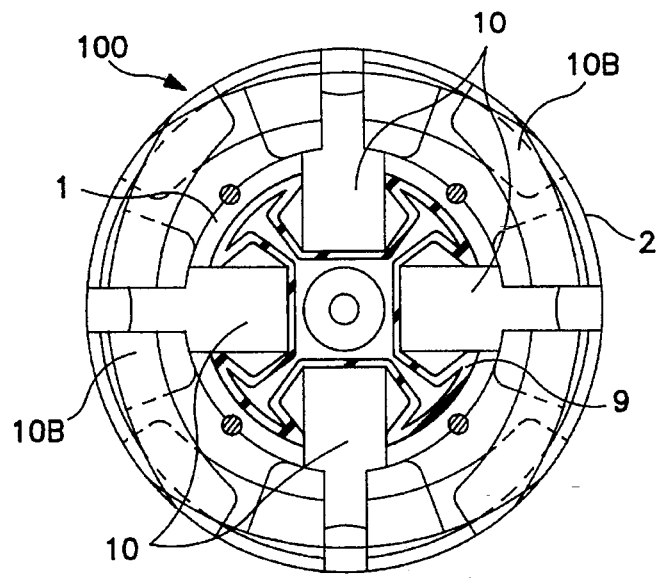
FIG. 3 is a cross sectional view of a variable outer diameter pulley taken along line 3—3 of FIG. 2.

A variable outer diameter pulley 100 used in a transmission in accordance with the first exemplary embodiment of the present invention is shown in FIG. 2 to FIG. 9. FIGS. 2 and 3 are cross sectional views of a variable outer diameter pulley 100 taken along line 2—2 of FIG. 1 and line 3—3 of FIG. 2, respectively.

Referring to FIG. 2 and FIG. 3a, pipe 1 contains a plurality of penetrating holes, for example four penetrating holes (apertures or receiving ports) 12 spaced 90 degrees apart in the cylindrical wall of the pipe 1. The pipe 1 is made of hard material such as metal, epoxy resin, fiber reinforced plastic or polystyrene and is formed from a metal pipe by a numerical controlled lathe or injection molding of resin. The pipe 1 is disposed between side plates 2 and 3 through a rim portion 9C (shown in FIG. 6) of a sealing part 9. The side plates 2,3 can be press formed from a metal plate, but they may be made by injection molding of resin.

Pipe 1 is disposed on axle 4. The side plates 2,3 are held in air-tight relation to pipe 1 by disk-shaped rubber packings 5, disc-shaped packing holders 6 and bolts 7.

Rectangular shaped anti-rotation plates 13 having generally semi-circular notches are put into the H-cut grooves at four locations (one each at upper and lower parts of the axle 4) as indicated by the letter C in FIG. 2 and are fixed to the side plates 2,3 together with the disc-shaped packing holders 6 by the bolts 7.

A part of the disc-shaped rubber packing 5 is forced in a direction to cause the peripheral part of the central aperture to contact the axle 4 and, according to the torque applied to the bolts 7, the rubber packings 5 form a seal between the axle 4 and the inside of the pipe 1. Accordingly, it is unnecessary to finish the surface of the axle 4 to a fine finish and sufficient sealing is effective even with a rough surface of the steel of the axle 4.

The side plates 2,3 and the pipe 1 are held in an air tight relation by the bolts 7, nuts 14 and the rim portions 9C (upper and lower, in FIG. 6) of the sealing part 9.

Figure 6:
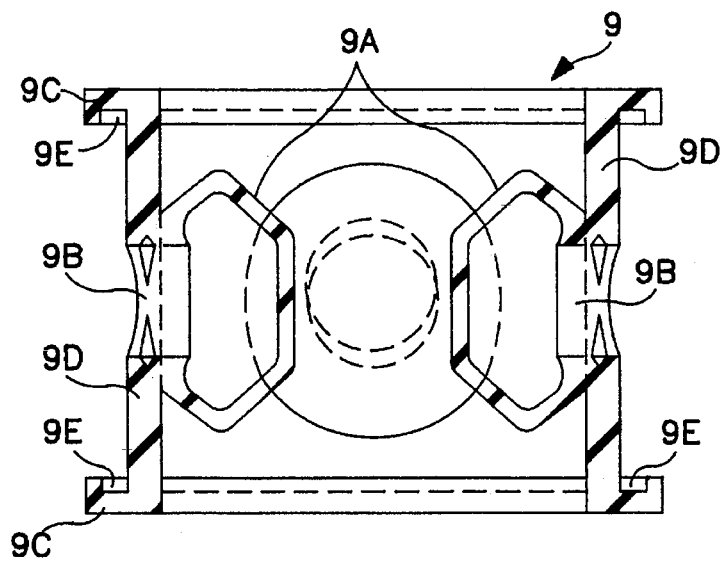
FIG. 6 is an enlarged cross sectional view of a sealing part included in the variable outer diameter pulley shown in FIG. 2.
Figure 7:
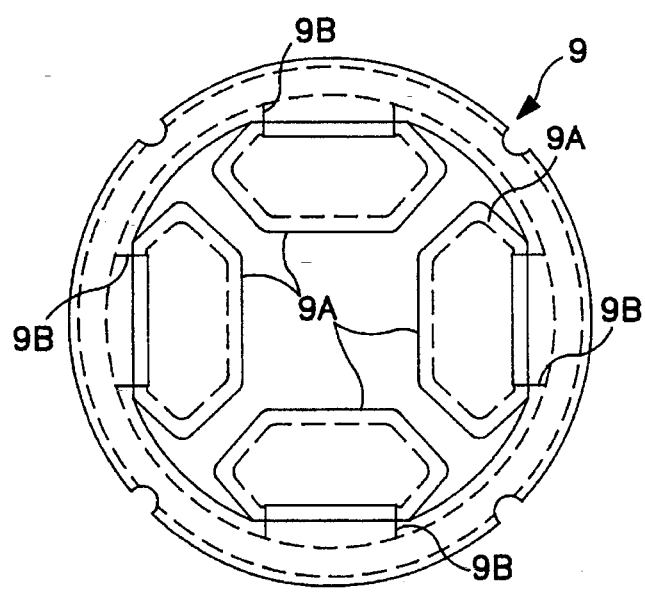
FIG. 7 is a cross sectional view of the sealing part shown in FIG. 6.

The sealing part 9 is formed by molding an elastic material such as silicone rubber, butyl rubber, or soft plastic in one unit as shown in FIGS. 6 and 7. Molding in one unit can be by, for example, casting or injection molding.

The sealing part 9 is tightly fitted into the pipe 1. As shown in FIGS. 6 and 7, the sealing part 9 is composed of a cylindrical trunk 9D, penetrating holes 9B, diaphragms 9A, rim portions 9C and circular grooves 9E.

The penetrating holes 9B are provided at four positions corresponding to each penetrating hole 12 provided on the cylindrical wall of the pipe 1 to support shafts 10A of sliders 10 which are fitted into the penetrating holes 9B and 12 so that the supporting shafts 10A can slide smoothly through the penetrating holes 9B and 12. The diaphragms 9A having a generally pot-shaped form are provided at four positions corresponding to each penetrating hole 12 provided on the cylindrical wall of the pipe 1 extend inside the cylindrical trunk 9D of sealing part 9.

The circular grooves 9E formed by the rim portions 9C of sealing part 9 overlap the edge of pipe 1 in order to make a tight seal possible between the side plates 2,3 and the pipe 1 by using the bolts 7 and the nuts 14. The shape of the diaphragm 9A of the sealing part 9 can be any shape such as a bellows or a polyhedron instead of a pot-shape.

The penetrating holes 12 in the cylindrical wall of the pipe 1 in which the supporting shafts 10A of the sliders 10 are able to move smoothly are tightly sealed by the diaphragms 9A of the sealing part 9 as shown in FIG. 2.

Figure 8:
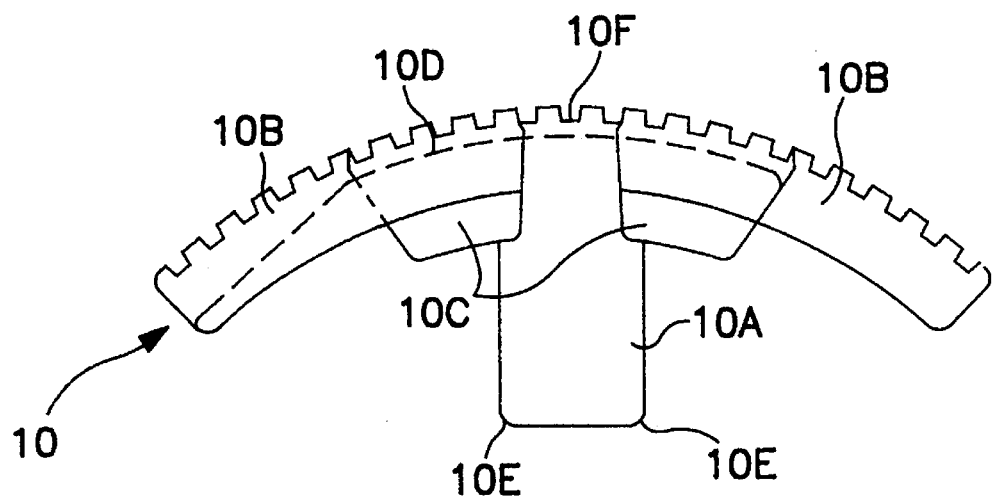
FIG. 8 is a side view of a slider included in a variable outer diameter pulley as shown in FIG. 2.
Figure 9:
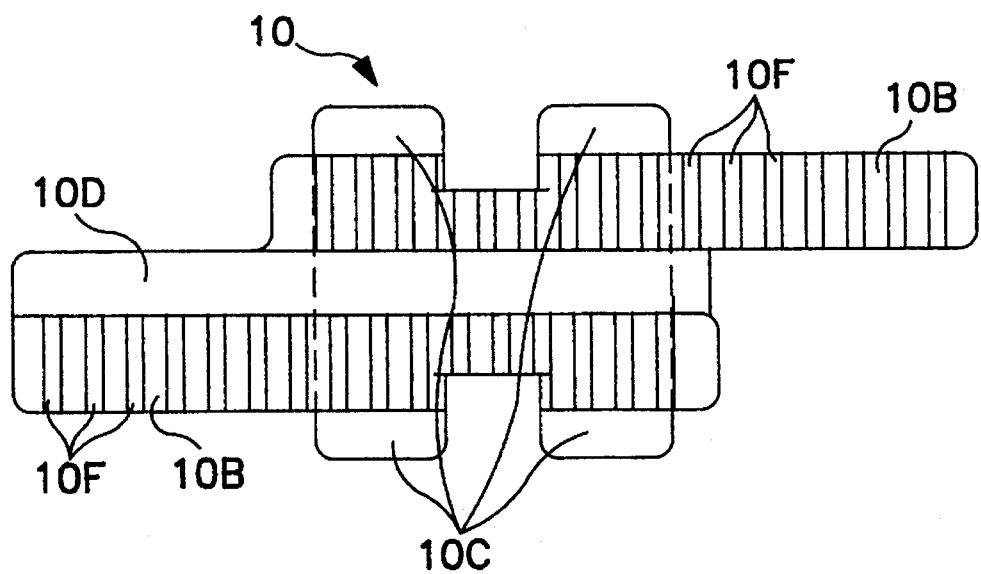
FIG. 9 is a top plan view of the slider shown in FIG. 8.

A side view and a top plan view of the slider 10 are shown in FIGS. 8 and 9, respectively. The sliders 10 are constructed so that gutters 10D are between arc-shaped pulley peripheral parts 10B. The arc-shaped pulley peripheral parts 10B are at an end of the supporting shaft 10A and form a pulley peripheral face. The sliders 10 are molded in a desired shape from a resin such as fiber reinforced plastic. They may be made by, for example, machining metal, die casting or injection molding metals or resins.

The grooves 10F are provided at evenly spaced intervals to increase friction when contacting a flat belt or using a timing belt.

FIG. 2 shows a variable outer diameter pulley 100 with a flat belt 20 held in tension on the outer peripheral surface. The outer periphery of the pulley is shown flat but it can be convex so that the belt does not slip off the pulley.

Figure 15:
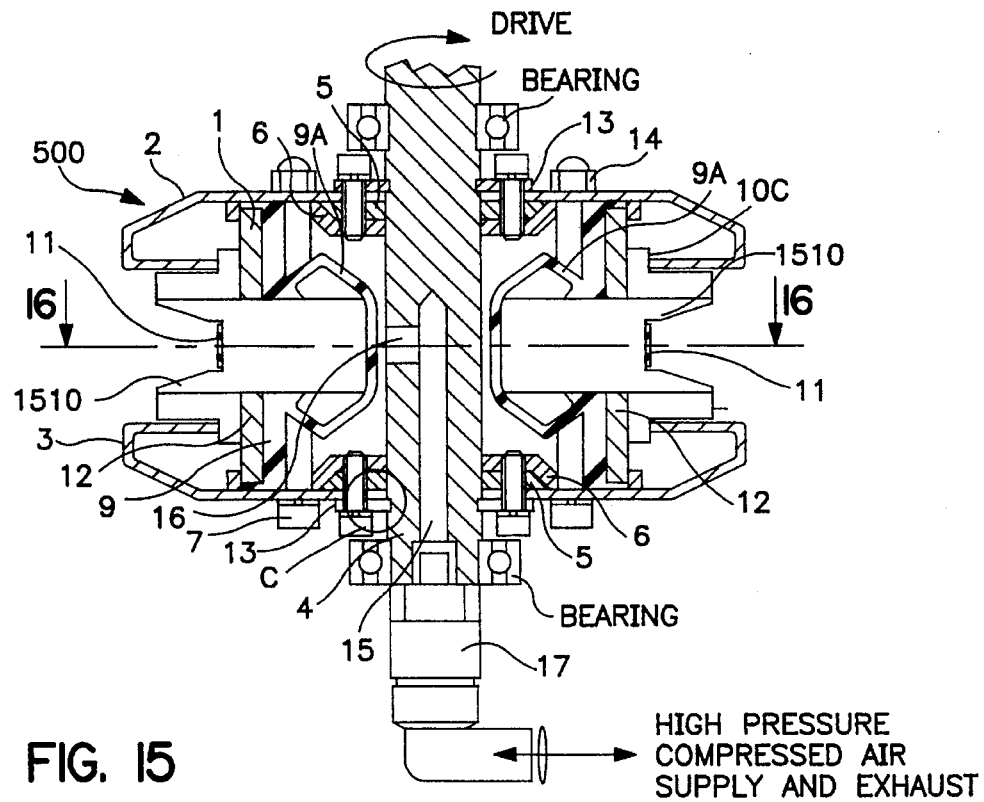
FIG. 15 is a cross sectional view of a variable outer diameter pulley used in a transmission taken along line 15—15 of FIG. 14.

The periphery of the pulley can be concave or V-shaped for a round belt or a V-belt, respectively. A cross sectional view of a variable outer diameter pulley 500 for a V-belt is shown in FIG. 15. A round belt can be used for the variable outer diameter pulley 500 with V-shaped grooves in its periphery. A plurality of parallel V-shaped grooves can be provided instead of a single groove.

A sprocket wheel can be used on the outer periphery of the pulley for a chain belt (not shown). It is necessary to design the number of gear teeth so that the gear will not slip even when a small diameter and enlarged diameter pair are used with a chain or a timing belt.

The sliders 10 are constructed so that the gutters 10D are between the arc-shaped pulley peripheral parts 10B which are at an end of the supporting shafts 10A and form a pulley peripheral face. By providing the arc-shaped pulley peripheral parts 10B with the shape as shown in FIG. 3 and with a designated deviation, when the sliders 10 are radially disposed at four positions 90 degrees apart from each other, the structure can prevent mutual interference of the arc-shaped pulley peripheral parts 10B and form pulley peripheral parts 10B which are continuous when the outer diameter of the pulley enlarges.

The shape of the pulley peripheral parts 10B is not restricted to being symmetrical and they may be located like an alphabetical letter Y or S so that they become continuous.

Figure 5:
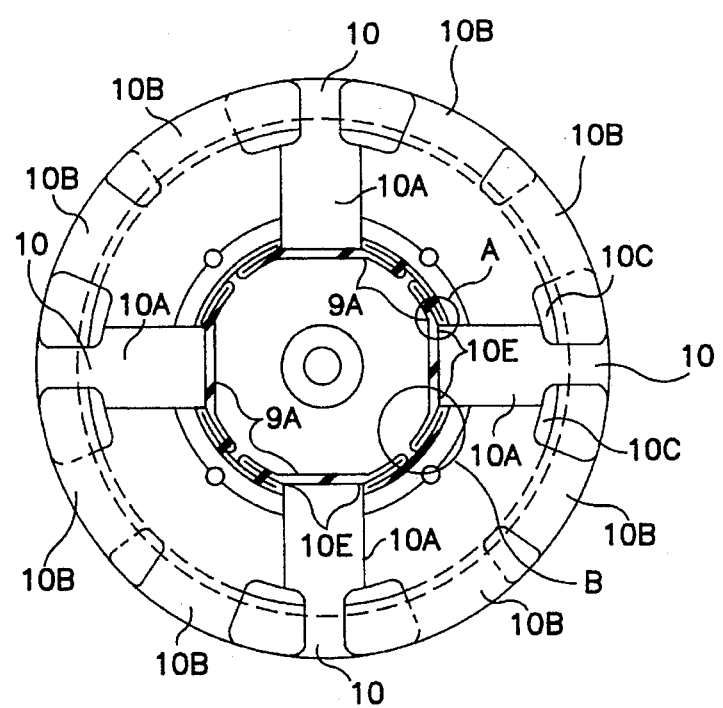
FIG. 5 is a cross sectional view of a variable outer diameter pulley taken along line 5—5 of FIG. 4.

At one end of the slider 10 is a supporting shaft 10A (as shown in FIG. 5) having a circular cross section. Rubber rings 11 (FIG. 2) are disposed in the gutter 10D of the sliders 10. The rubber ring 11 functions to push the sliders 10 (four pieces in the exemplary embodiment shown in FIG.2) simultaneously towards the axis of the axle 4 and to restore the sliders 10 to the original positions when the variable outer diameter pulley has a small diameter. Instead of using the rubber ring 11 to restore the sliders 10 to their original positions, means to give negative pressure to the diaphragms 9A, such as ring-shaped tension coil springs connecting their starting point and ending point or any other means may be used.

Compressed air is supplied to the cylindrical trunk 9D of the sealing part 9 by a designated timing signal through a rotary air coupling 17, a blind hole or fluid passage 15 along the axis of the axle 4 and a transverse connecting hole 16.

Figure 4:
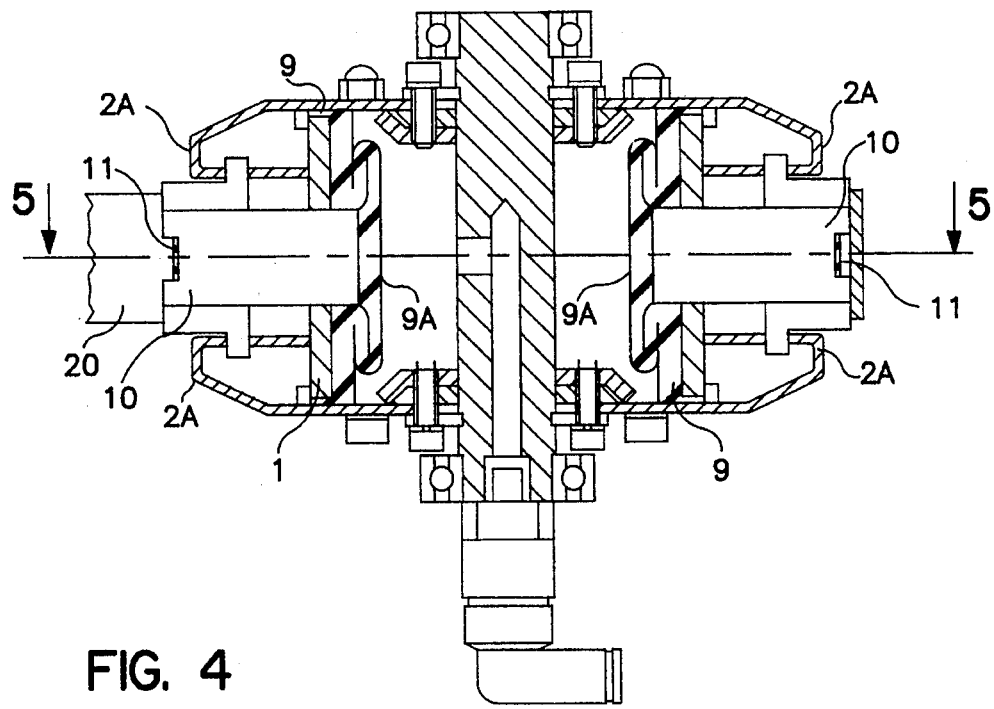
FIG. 4 is a cross-sectional view of a variable outer diameter pulley as shown in FIG. 2, after compressed air is supplied to the pulley.

The diaphragms 9A of the sealing part 9 shown in FIG. 4 and marked by B in FIG. 5 are pushed by the compressed air, deform from a pot-shape to a flat plate-shape, and push the supporting shafts 10A of the sliders 10 further out of the penetrating holes 12 of the pipe 1.

The end of the stroke (movement) of the sliders 10 pushed by the compressed air is a working limit (upper dead point) of the sliders 10 where the protruding parts 10C of the sliders 10 strike against the hook-shaped rim portions 2A and 3A of the C-shaped side plates 2 and 3 respectively.

The pulley peripheral parts 10B of the sliders 10 that are pushed outside the pipe 1 form a peripheral face having a desired larger outer diameter as shown in FIGS. 4 and 5. At the same time, they expand the rubber ring 11 fixed in the gutters 10D of the sliders 10.

The pressure resistance of cylindrical elastics made of rubber is usually as small as about 2 kgf/cm.

In the present invention, compressed air of 2 to 5 kgf/cm can be supplied to the diaphragms 9A. At pressures used to enlarge the pulley, the diaphragms 9A made of soft rubber deform to flat plates and are pushed into sharp edges or into small gaps. Repeated action on the diaphragm 9A causes the soft surface of the diaphragm 9A to peel off little by little, and eventually its pressure resistance strength decreases and the diaphragm 9A will burst. In order to prevent the explosion or cracking of the diaphragms 9A from repeated working under high pressure, the edges of the supporting shafts 10A are made with round corners 10E as shown in FIG. 8.

Working with compressed air, the deformed portions of the diaphragms 9A are pushed to the inside wall of the cylindrical trunk 9D of the sealing part 9 and round corners 10E of the supporting shafts 10A, as shown in the circle A in FIG. 5, minimize the bending distortion of the sealing part 9.

The diaphragms 9A constructed in accordance with the present invention could realize a working life of over 2 million cycles under an air pressure of more than 5 kgf/cm.

When the compressed air pushing on diaphragms 9A is exhausted through fluid passage 15 of the axle 4, the outer diameter of the variable outer diameter pulley 100 retracts from an enlarged diameter to an original small diameter.

As the air pressure decreases inside the sealing part 9, the supporting shafts 10A are pushed inside the pipe 1 by the tension of the rubber ring 11 to restore the sliders 10 to their original positions as shown in FIGS. 2 and 3. Then the peripheral face (outer diameter) of the pulley peripheral part 10B becomes smaller than the outer diameter of the side plates 2 and 3.

In a small outer diameter state shown in FIG. 3, the pulley peripheral parts 10B of the sliders 10 do not form a smooth circle. Unevenness occurs at the overlapped edge portions of the pulley peripheral parts 10B. This is because of the desire to obtain a smooth circular peripheral face in an enlarged outer diameter state. As shown in FIG. 3, this is usually no obstacle in power transmissions, but if there is a problem the uneven parts may be removed by chamfering the edge portions of the pulley peripheral parts 10B or reducing the overlapped portions. Instead of designing a smooth peripheral face at an enlarged outer diameter state, a smooth peripheral face at a small outer diameter state may be designed.

Another exemplary embodiment of a variable outer diameter pulley 400 is shown in FIGS. 10, 11, 12 and 13. This embodiment includes a hollow axle 121 having a fluid supply passage 132 inside the axle 121 and a plurality of connecting holes 122 radially disposed in the wall of the fluid passage 132. The fluid passage 132 is connected to a fluid supply (not shown). Sliders 124 are fitted into penetrating holes 128 in the variable outer diameter pulleys 400 to be able to slide in the penetrating holes 128 and form a pulley peripheral face. The sliders 124 are constructed so that they are pushed and moved in the direction to increase the outer diameter of the pulley 400 by fluid supplied to the fluid passage 132 and the connecting holes 122.

The variable outer diameter pulley 400 has no sealing part, such as found in a variable outer diameter pulley 100 of FIG. 2.

The variable outer diameter pulleys 100 and 400 are manufactured with the gap between the sliders and the side plates to which the sliders fit being very small, e.g. several ten micrometers wide and are finished to fit in accordance with H7f6 fitting grade. H7 refers to the tolerance on the hole or bearing side and f6 refers to the tolerance on the shaft. Grade H7f6 denotes about a 20 micrometer gap. Finishing to this degree results in the pulley outer diameter being small and the variable outer diameter pulley being compact.

Figure 10:
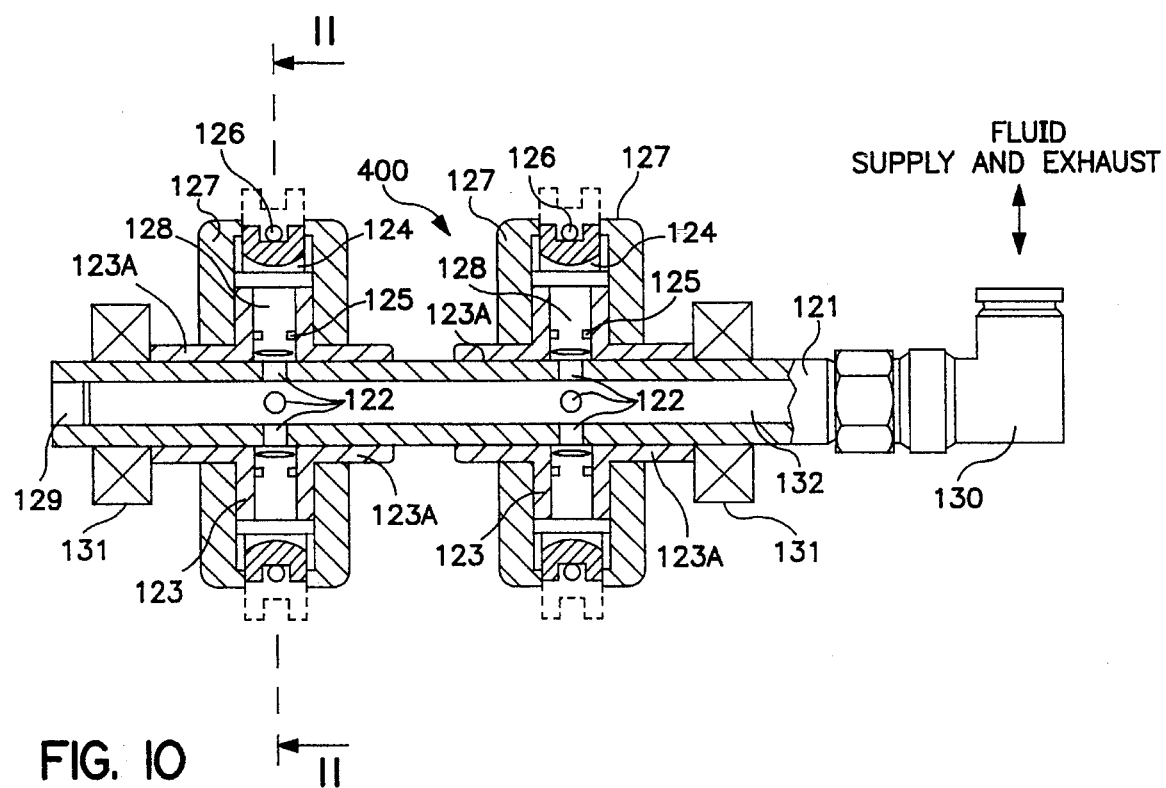
FIG. 10 is a cross sectional view of another variable outer diameter pulley for use with a transmission as shown in FIG. 1, taken in a plane including the axis of the axle.
Figure 11:
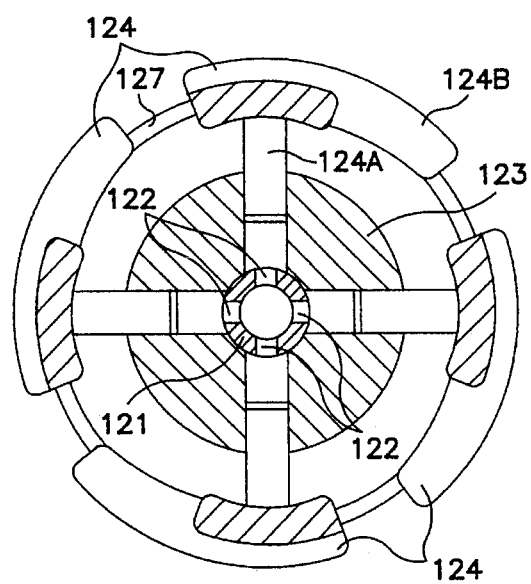
FIG. 11 is a cross sectional view of a variable outer diameter pulley taken along line 11—11 of FIG. 10.
Figure 12:
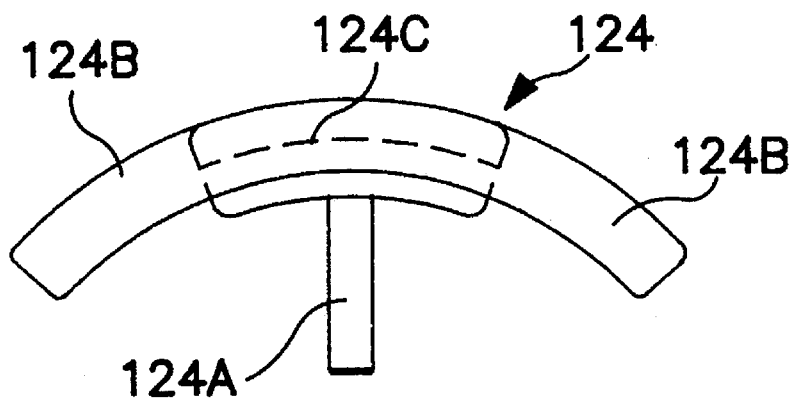
FIG. 12 is a side view of a slider included in a variable outer diameter pulley as shown in FIG. 10.
Figure 13:
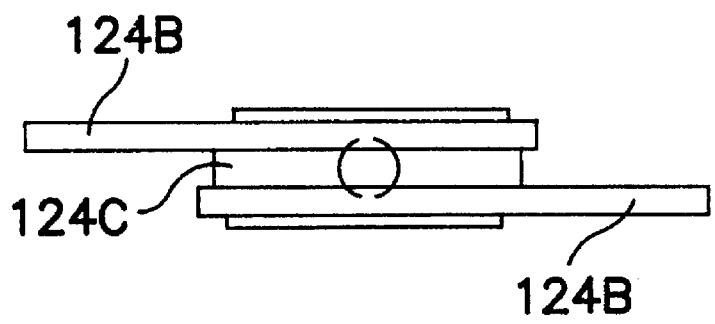
FIG. 13 is a top plan view of the slider shown in FIG. 12.

FIG. 10 is a cross sectional view of two variable outer diameter pulleys 400 attached at two positions on the hollow axle 121. FIG. 11 is a cross sectional view taken along line 11—11 of FIG. 10 and shows the position of the sliders 124 when fluid is supplied to hollow axle 121 and the pulley outer diameter enlarges. Rings 125 are omitted from this view for ease of illustration. FIGS. 12 and 13 are a side view and a top plan view of the slider 124, respectively.

Referring to FIG. 10, one end of the hollow axle 121 having a longitudinal passage 132 to supply fluid (for example air) along the axis of the fluid passage 132 of the hollow axle 121 is closed by a plug 129 and a rotary air coupling 130 is attached to the other end of the hollow axle 121. Air of a designated pressure is supplied to the fluid passage 132 of the axle 121 through a rotary air coupling 130.

The hollow axle 121 has a fixed length and is supported by bearings 131 provided at both ends of the hollow axle 121.

The hollow axle 121 has four connecting holes 122 in the wall of the fluid passage 132 of the hollow axle 121 radially positioned 90 degrees apart for each variable outer diameter pulley 400. Thus, the hollow axle 121 has total of eight connecting passages (holes) 122.

The main disks 123 for supporting the sliders 124 are mounted on the hollow axle 121. As shown in FIG. 10, two main disks 123 are mounted on the hollow axle 121. The main disk 123 includes four penetrating holes 128 positioned over the connecting holes 122 so that each penetrating hole 128 is connected to the fluid passage 132 through the connecting hole 122.

The sliders 124 are fitted into each penetrating hole 128 of the main disk 123 so that the sliders 124 can slide smoothly in the penetrating holes 128. In FIG. 10, four sliders 124 are fitted into the main disk 123. Each slider 124 includes a supporting shaft 124A and a pulley peripheral part 124B (as shown in FIG. 11), similar to the slider 10 of FIG. 2. The supporting shaft 124A has a designated clearance (gap) for fitting into the penetrating hole 128 and is finished to fit in accordance with H7f6 grade. One or two sealing rings 125 are attached around the supporting shaft 124A of the slider 124 at one or two positions (in FIG. 11, one position is shown) to prevent air leakage and dust infiltration.

The surface of the supporting shaft 124A is finished to a smooth surface, approaching a mirror surface, by turning on a lathe or grinding. When the slider 124 is made of resin or the like, however, a molding die with improved surface smoothness may be used and finishing work for the slider itself may be omitted.

The slider 124 provides two arc-shaped pulley peripheral parts 124B extending equally from the shaft 24A and a gutter 124C is provided between the two pulley peripheral parts 124B as shown in FIG. 13.

The shape of the pulley peripheral part 124B of the slider 124 is similar to the shape of the pulley peripheral part 10B of the slider 10 shown in FIG. 8 and the function and the construction of a tension coil spring 126 is similar to the rubber ring 11 of the assembly of FIG. 2. Enlarging of the outer diameter of the pulley 400 is done in a manner similar to that of the variable outer diameter pulley 100, thus the explanation is omitted.

In FIG. 10, the positions of the sliders 124 indicated by a broken line show the position of the outer diameters of the pulley 400 when enlarged by air.

Two side plates 127 fixed on the outside of the main disk 123 restrict the motion of the sliders 124 and prevent rotation of the supporting shaft 124A of the slider 124.

The side plates 127 define a maximum diameter of the variable outer diameter pulley 400 and prevent the sliders 124 from falling out of the penetrating holes 128 when the desired fluid pressure is introduced into the fluid passage 132.

Other methods and devices for holding the sliders 124 may be used for the variable outer diameter pulley 400 shown in FIG. 10. For example, a construction in which a main disk 123 and side plates 127 are made in one unit, a construction in which holding is done only by side plates 127 without a main disk 123, and a construction in which a main disk 123, side plates 127 and a hollow axle 121 are made in one unit.

Any material such as metal, resin or composite material may be used for the parts included in the variable outer diameter pulley of the present invention. Any manufacturing means such as die casting, injection molding, press forming or cutting may be used to make the parts.

Second Exemplary Embodiment

Figure 14A:
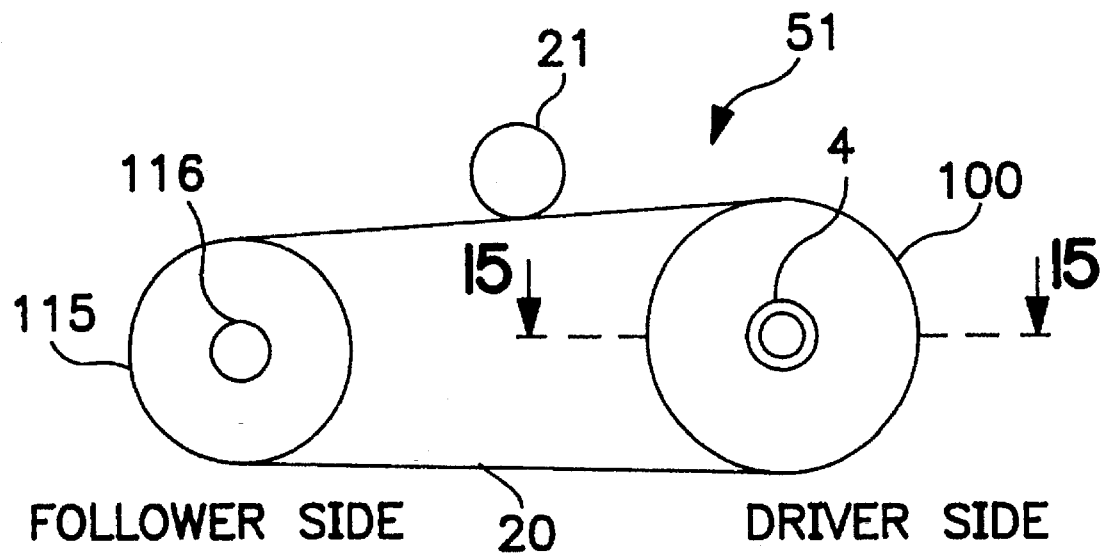
FIGS. 14(A) and (B) are schematic representations of a transmission in accordance with a second exemplary embodiment of the present invention.
Figure 14B:
Figure 14B:
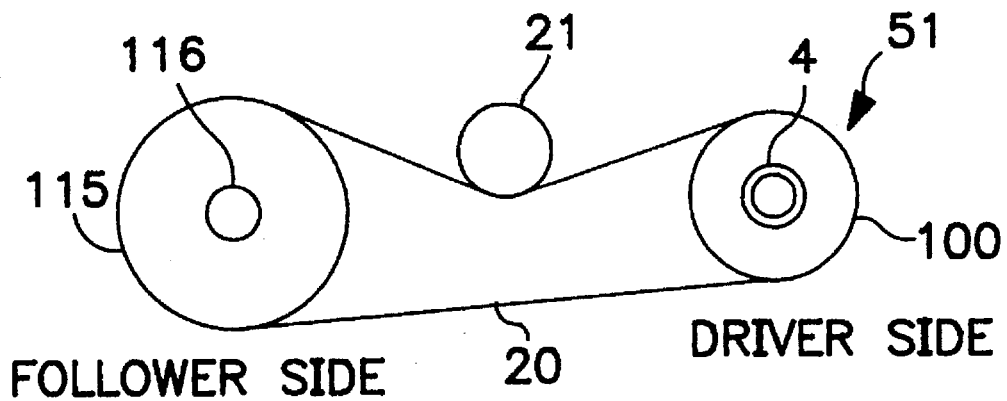

A schematic representation of a transmission 51 in accordance with a second exemplary embodiment of the present invention is illustrated in FIGS. 14A and 14B. A variable outer diameter pulley 100 is mounted only at a driver side and a fixed outer diameter pulley 115 is mounted at a follower side. Accordingly, the follower side has two speeds of revolution. In this case, an axle 116 at the follower side may be any one of a solid shaft or a hollow shaft. A construction is also possible in which a variable outer diameter pulley 100 is mounted at a follower side and a fixed outer diameter pulley 115 is mounted at a driver side.

FIG. 14(A) illustrates a state in which the variable outer diameter pulley 100 at the driver side is supplied with fluid and its outer diameter expands to a large size. FIG. 14(B) illustrates a state which the variable outer diameter pulley 100 at the driver side is exhausted of fluid and its outer diameter shrinks to an original small size.

FIG. 15 is a cross sectional view of a variable outer diameter pulley 500 taken along line 15—15 of FIG. 14A and shows a state in which the pulley peripheral face forms a smooth and small outer diameter by causing the sliders 1510 to be fully retracted into penetrating holes 12 by exhausting fluid from the pulley 500.

Figure 16:
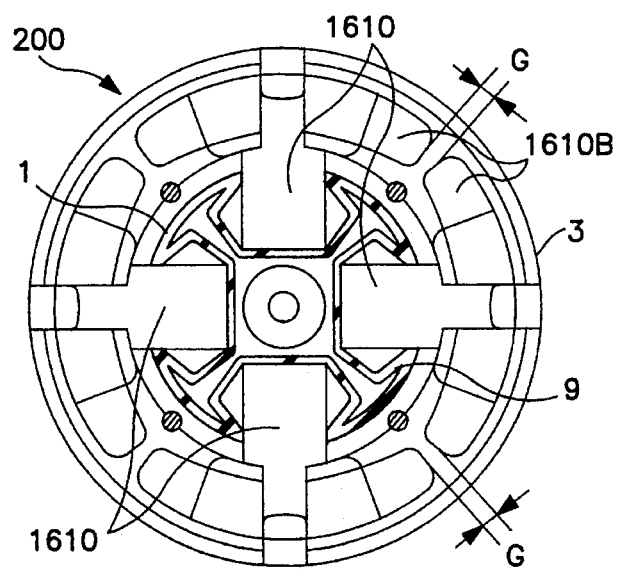
FIG. 16 is a cross sectional view of a variable outer diameter pulley taken along line 16—16 of FIG. 15.

FIG. 16 is a cross sectional view of the variable outer diameter pulley 500 taken along line 16—16 of FIG. 15. Gaps are provided between adjacent pulley peripheral parts 1610B of the sliders 1610. The size of the gaps are exaggerated in FIG. 16. In the state in which the outer diameter expands due to fluid pressure being supplied to the fluid passage 15 of the shaft, the gaps between the adjacent pulley peripheral parts 1610B of the sliders 1610 enlarge further.

Other variations than those discussed in relation to the above-mentioned structure of a variable outer diameter pulley where the sliders are spaced 90 degrees apart can be used.

Thus, a transmission with variable outer diameter pulleys in which the outer diameter of the pulley expands by radially moving sliders is simple to construct and is superior in fatigue resistance. Any one of a flat belt, a round belt, a timing belt, a V-belt, or a chain can be used as the power transmission means.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A transmission comprising:

a pair of pulleys at least one pulley having a variable outer diameter; and means for transmitting power between said pair of pulleys;

said variable outer diameter pulley comprises:

a pipe containing a plurality of penetrating holes disposed radially around a side wall of said pipe;

supporting means having an internal fluid supply passage and a plurality of penetrating holes disposed radially around a side wall of said supporting means; and a slider disposed in each of said penetrating holes and forming a pulley peripheral face; wherein:

said sliders are moved by fluid supplied through said fluid supply passage in a direction so that the outer diameter of said variable outer diameter pulley enlarges.

2. A transmission as recited in claim 1, wherein each of said sliders comprise:

arc parts forming pulley peripheral parts with a designated angle for positioning a belt; and a plurality of supporting shafts disposed in said plurality of penetrating holes.

3. A transmission as recited in claim 2, wherein:

said belt is one of a round belt, a flat belt, a V-belt and a timing belt.

4. A transmission as recited in claim 1, wherein each of said sliders comprises:

arc parts forming pulley peripheral parts with a designated angle for positioning a chain; and a plurality of supporting shafts disposed in said plurality of penetrating holes.

5. A transmission comprising:

a pair of variable outer diameter pulleys; and power transmission means for transmitting power between said pair of variable outer diameter pulleys;

each one of said pair of variable outer diameter pulleys comprises:

a pipe containing a plurality of penetrating holes disposed radially around the side wall of said pipe;

supporting means having a diaphragm disposed in each of said penetrating holes; and a slider disposed in each of said penetrating holes and forming a pulley peripheral face; wherein:

said sliders are moved by a fluid supplied through a fluid supply passage in a direction so that the outer diameter of said variable outer diameter pulley enlarges.

6. A transmission as recited in claim 5, wherein each of said sliders comprises:

arc parts forming pulley peripheral parts with a designated angle for positioning a belt; and supporting shafts disposed in said penetrating holes.

7. A transmission as recited in claim 6, wherein: said belt is one of a round belt, a flat belt, a V-belt and a timing belt.

8. A transmission as recited in claim 5, wherein each of said sliders comprise:

arc parts forming pulley peripheral parts with a designated angle for positioning a chain; and supporting shafts disposed in said penetrating holes.

9. A transmission comprising:

a pair of variable outer diameter pulleys; and means for transmitting power between said pair of variable outer diameter pulleys;

each one of said pair of variable outer diameter pulleys comprises:

a pipe containing a plurality of penetrating holes set radially around the side wall of said pipe;

a sealing part having a diaphragm positioned adjacent each of said penetrating holes inside said pipe; and a slider disposed in each of said penetrating holes and forming a pulley peripheral face; wherein:

said sealing parts and said pipe are held in an air-tight relationship between side plates provided on both ends of said pipe; and said sliders are moved by a fluid supplied through a fluid supply passage in a direction so that the outer diameter of said variable outer diameter pulleys enlarges.

10. A transmission as recited in claim 9, wherein each of said sliders comprises:

arc parts forming pulley peripheral parts with a designated angle for positioning a belt; and supporting shafts disposed in said penetrating holes.

11. A transmission as recited in claim 10, wherein:

said belt is one of a round belt, a flat belt, a V-belt and a timing belt.

12. A transmission as recited in claim 9, wherein each of said sliders comprises:

arc parts forming pulley peripheral parts with a designated angle for positioning a chain; and supporting shafts disposed in said penetrating holes.

13. A transmission comprising:

a pair of pulleys, one of which is a variable outer diameter pulley; and means for transmitting power between said pair of pulleys;

said variable outer diameter pulley comprises:
- a pipe containing a plurality of penetrating holes disposed radially around the side wall of said pipe;
- supporting means having a fluid supply passage connected to said plurality of penetrating holes; and
- a slider disposed in each of said penetrating holes and forming a pulley peripheral face; wherein:

said plurality of sliders are moved by a fluid supplied through said fluid supply passage in a direction so that the outer diameter of said variable outer diameter pulley enlarges.

14. A transmission as recited in claim 13, wherein each of said sliders comprises:

arc parts forming pulley peripheral parts with a designated angle for tensing a belt; and supporting shafts disposed in said penetrating holes.

15. A transmission as recited in claim 14, wherein: said belt is one of a round belt, a flat belt, a V-belt and a timing belt.

16. A transmission as recited in claim 13, wherein each of said sliders comprises:

arc parts forming pulley peripheral parts with a designated angle for positioning a chain; and supporting shafts disposed in said penetrating holes.

17. A transmission comprising:

a pair of pulleys, one of which is a variable outer diameter pulley; and means for transmitting power between said pair of pulleys;

said variable outer diameter pulley comprises:
- a pipe containing a plurality of penetrating holes set radially around the side wall of said pipe;
- supporting means having a diaphragm disposed in each of said plurality of penetrating holes; and
- a slider disposed in each of said plurality of penetrating holes and forming a pulley peripheral face; wherein:

said sliders are moved by a fluid supplied through a fluid supply passage in a direction so that the outer diameter of said variable outer diameter pulley enlarges.

18. A transmission comprising:

a pair of pulleys, one of which is a variable outer diameter pulley; and power transmission means for transmitting power between said pair of pulleys;

said variable outer diameter pulley comprises:
- a pipe containing a plurality of penetrating holes set radially around the side wall of said pipe;
- a sealing part having a diaphragm positioned adjacent each of said penetrating holes inside said pipe; and
- a slider disposed in each of said plurality of penetrating holes and forming a pulley peripheral face; wherein:

said sealing parts and said pipe are held in an airtight relationship between side plates provided on both ends of said pipe; and said sliders are moved by a fluid supplied through a fluid supply passage in a direction so that the outer diameter of said variable outer diameter pulley enlarges.

* * * * *